July 31, 1956  R. B. JACOBS ET AL  2,757,290
ION CHAMBER PERCENT HYDROGEN INSTRUMENT
Filed April 30, 1952  6 Sheets-Sheet 1

Fig.1

INVENTORS:
Robert B. Jacobs
Evon C. Greanias
BY Everett A. Johnson
ATTORNEY

July 31, 1956

R. B. JACOBS ET AL 2,757,290

ION CHAMBER PERCENT HYDROGEN INSTRUMENT

Filed April 30, 1952

INVENTORS:
Robert B. Jacobs
Evon C. Greanias
BY
Everett A. Johnson
ATTORNEY

INVENTORS:
Robert B. Jacobs
Evon C. Greanias
BY Everett A. Johnson
ATTORNEY

July 31, 1956  R. B. JACOBS ET AL  2,757,290
ION CHAMBER PERCENT HYDROGEN INSTRUMENT
Filed April 30, 1952  6 Sheets-Sheet 4

INVENTORS:
Robert B. Jacobs
Evon C. Greanias
BY Everett A. Johnson
ATTORNEY

July 31, 1956  R. B. JACOBS ET AL  2,757,290
ION CHAMBER PERCENT HYDROGEN INSTRUMENT
Filed April 30, 1952  6 Sheets-Sheet 5

INVENTORS:
Robert B. Jacobs
Evon C. Greanias
BY Everett A. Johnson
ATTORNEY

United States Patent Office 2,757,290
Patented July 31, 1956

2,757,290

ION CHAMBER PERCENT HYDROGEN INSTRUMENT

Robert B. Jacobs, Homewood, and Evon C. Greanias, Chicago, Ill., assignors to Standard Oil Company, Chicago, Ill., a corporation of Indiana Application April 30, 1952, Serial No. 285,348

14 Claims. (Cl. 250—43.5)

This invention relates to a method and apparatus for determining hydrogen in a substance without destructive chemical analysis thereof. It pertains more specifically to an apparatus employing a beta ray source for determining and indicating the hydrogen density in solids, liquids, or gases.

It is frequently desirable to ascertain accurately the hydrogen density in compounds or mixtures which heretofore could be determined only by time-consuming operations involving chemical analyses. For example, it is well known that the carbon:hydrogen ratio of hydrocarbons is a basic and important property. The degree of hydrogen saturation or density of this component of gasoline affects their knocking property and the burning quality of a heater oil is directly related to its carbon:hydrogen ratio. Thus there is a close connection between the carbon:hydrogen ratio of a petroleum product and its commercial utility. However, the measurement of the carbon:hydrogen ratio as heretofore performed is so difficult and time-consuming that it is seldom used as a specification in commercial practice.

It is, therefore, a primary object of our invention to provide a method and apparatus which will give an accurate indication of hydrogen density without the necessity of ay physical separation or chemical reaction. A further object of our invention is to provide a system for determining carbon:hydrogen ratios of hydrocarbons by physical means. An additional object of our invention is to provide such a system which is adaptable for routine control determination of hydrogen in homogeneous substances. Still another object of our invention is to provide a null type instrument which is relatively simple and foolproof in operation. A more specific object of our invention is to provide an apparatus which has a minimum of moving parts and is capable of being manipulated by other than highly trained technical personnel. These and other objects of our invention will become apparent as the description thereof proceeds.

Briefly, to determine the percent hydrogen of a hydrocarbon sample, two measurements are required; the electron density and the specific gravity. Electron density is determined by measuring the beta ray transmission of the sample. The necessary specific gravity measurement is made by accurately weighing a bob of known weight and volume in the sample.

To measure the beta ray transmission of the sample, a beam of beta rays from a radio-active source is directed through the sample, confined in a sample cell. The beta ray source may be made by depositing a thin layer of radio-active strontium salt on a thin noble metal foil. A second piece of foil is used to cover the radio-active material and the two foils are then sealed around the edges. Such a source provides two beta ray beams, one emitting from each foil.

One beam of beta rays from such a source is directed through the sample confined in a cell and then through a compensated movable wedge into one of two opposing ionization chambers. The beta rays which reach the first ionization chamber cause a positive electric current to flow from a battery to a current indicator. A second beam of beta rays from the same source passes through a standard Invar absorber and thence into the second ionization chamber. The beta rays which reach the second ionization chamber, cause a negative current to flow from the battery and then to ground through the indicator.

When the two ion chambers conduct equally, zero net current passes through the current indicator which may be a suitable electrometer circuit. The operator adjusts the movable wedge until there is a balance between the two ion chambers, i. e. equal beta rays in both ion chambers which results in zero current.

Since the current indicator is only used as a null indicator, its sensitivity does not affect the calibration of the instrument. Likewise, by using a single battery with its ends grounded through equal resistors, the relative sensitivity of the two ion chambers is not affected by changes in battery voltage.

The balance position of the movable wedge is accurately indicated by means of a high-precision dial gage. The dial gage may be calibrated in terms of electron density with pure compounds of known composition; or, since it can be assumed that electron density is proportional to the quantity $\rho+\rho H$, where $\rho$ is liquid density in grams per cc. and $\rho H$ is density of hydrogen atoms in grams per cc., a more practical calibration can be made in terms of the quantity $\rho+\rho H$.

When the wedge has been adjusted to null electrometer current, the beta ray beams to each ion chamber suffer equivalent absorption in their paths. The position of the wedge indicates how much additional absorber in the form of wedge material was added to the absorber in the sample cell to bring the total absorption up to that of the standard absorber. Since only the absorber in the cell and the absorber in the wedge can change, and their sum is a constant at balance; when one is known the other can be determined. The absorption in the cell depends only on the cell thickness and $\rho+\rho H$ of the liquid sample. Since the cell thickness is constant, the absorption in the cell (and the position of the wedge at balance) depends only upon $\rho+\rho H$. If a wedge with a linear taper is used then $\rho+\rho H$ will be linear with the wedge position and a linear scale can be used on the dial gage to give $\rho+\rho H$ directly.

To permit making the specific gravity measurement and the electron density measurement under identical temperature conditions, we provide a reservoir and sample cell in a single massive metal block. The reservoir and cell are directly connected by an internal channel which brings the new sample to the proper temperature as the cell is filled by pouring the sample into the reservoir.

Liquid density is determined by weighing a bob of known volume in the liquid sample with a high precision torsion balance. The torsion balance is counterweighed to make the net torque on the beam equal zero when the bob is emersed in the most dense material to be considered. When lighter material is used the torque on the beam changes, resulting in an apparent increase in weight of the bob, then $W=$the apparent weight increase$=V\Delta\rho$ where:

$V=$the bob volume
$\Delta\rho=$density difference between unknown and most dense liquid ($\rho$ max).

Then:

$$\rho=\rho\ \text{max}-\Delta\rho=\rho\ \text{max}-\frac{W}{V}$$

Since V and $\rho$ max are known, the torsion balance can be calibrated to read density directly.

The complete experimental procedure comprises filling the reservoir and sample cell with unknown; measuring the density of the sample; setting the zero of the current indicator with the beta source shuttered; exposing the beta ray source and adjusting the wedge to balance the instrument; recording the scale reading in terms of $\rho+\rho H$ directly; and obtaining $\rho H$ by subtracting the measured liquid density $\rho$ from the observed sum of $\rho+\rho H$.

By this instrument we are enabled to obtain the hydrogen density of the sample, i. e. the density of the hydrogen atoms by weight in the volume of the sample. This value can be obtained independent of the other components of the sample whether a mixture or a chemical combination.

Since the sample's density is also known the hydrogen percentage $$\frac{\rho H}{\rho} \times 100$$

can be calculated easily, and for the case of hydrocarbons, the carbon:hydrogen ratio can be obtained by simple algebra.

Further details of the invention will be described in connection with the attached drawings which form a part hereof and wherein.

Figure 1:
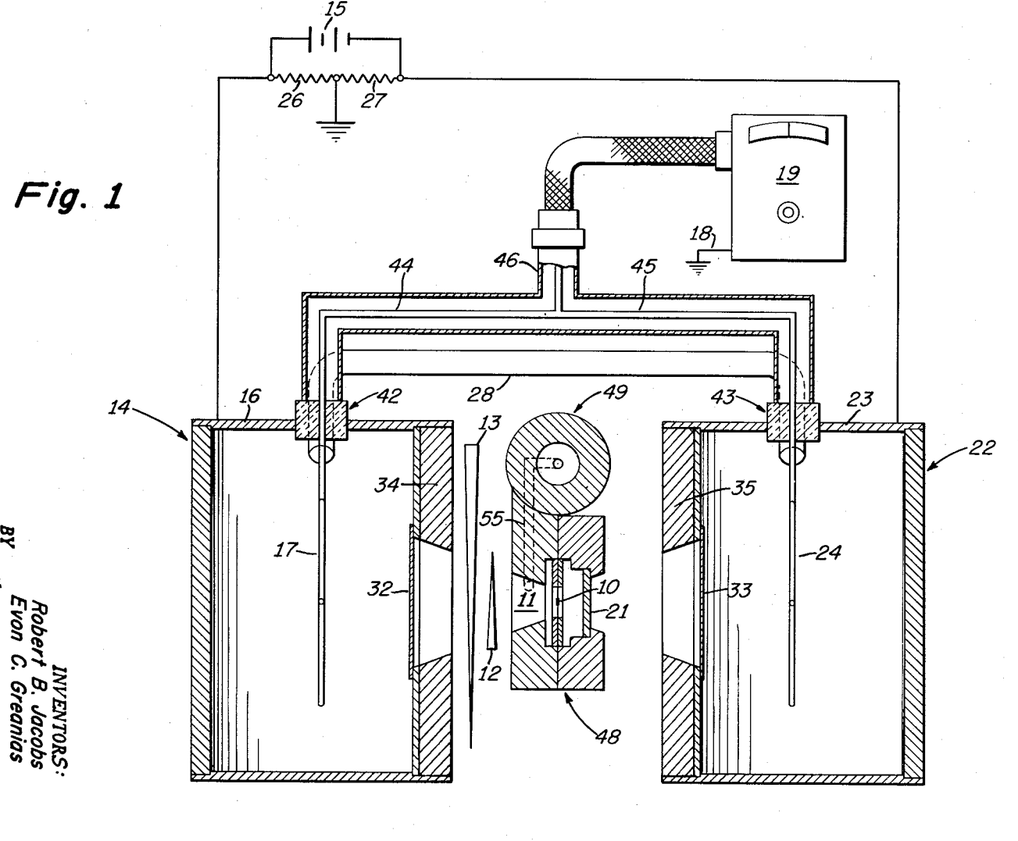
Figure 1 is a schematic diagram of one form of the apparatus.

In Figure 1 we have schematically illustrated the null type instrument employing ion chambers and a beta ray source for the indication of electron density. For this purpose a beam of beta rays from the radioactive source 10 is directed through the sample confined in cell 11 and then through the wedge compensator 12 and movable wedge 13 into the ionization chamber 14. The beta rays which reach the ionization chamber 14 cause a positive electric current to flow from the battery 15 to the walls 16, to the collector 17 and then to ground 18 through the high-sensitivity current indicator 19. A second beam of beta rays from source 10 passes through a standard absorber 21 into the ionization chamber 22. The beta rays which reach chamber 22 cause a negative current to flow from the battery 15 to the walls 23, to the collector 24 and then to ground 18 through the current indicator 19. When the ion chambers 14 and 22 conduct equally, zero net current passes through the current indicator 19.

The operator achieves balance, i. e. equal beta rays to each of chambers 14 and 22 by adjusting the movable wedge 13 for zero current as indicated by the current indicator 19. The position of the wedge 13 is calibrated in terms of $\rho+\rho H$ with pure compounds of known composition. By using a single battery 15 with its ends grounded through the equal resistors 26 and 27, the relative sensitivity of the ion chambers 14 and 22 is not affected by changes in battery voltage. An electrically insulated breathing tube 28 keeps the gas in both ion chambers 14 and 22 at the same temperature, pressure, and humidity, thereby aiding in maintaining constant relative sensitivity between the two ion chambers.

In Figures 2 to 7, we have illustrated in greater detail components of the device diagrammatically shown in Figure 1. A base plate 89 serves as a subframe for the apparatus and this unit is enclosed within a cabinet (shown in Figures 8, 9 and 10) which also includes the electrometer circuit, the galvanometer, the gage dial, the torsion balance, and also houses the necessary batteries.

Figure 2:
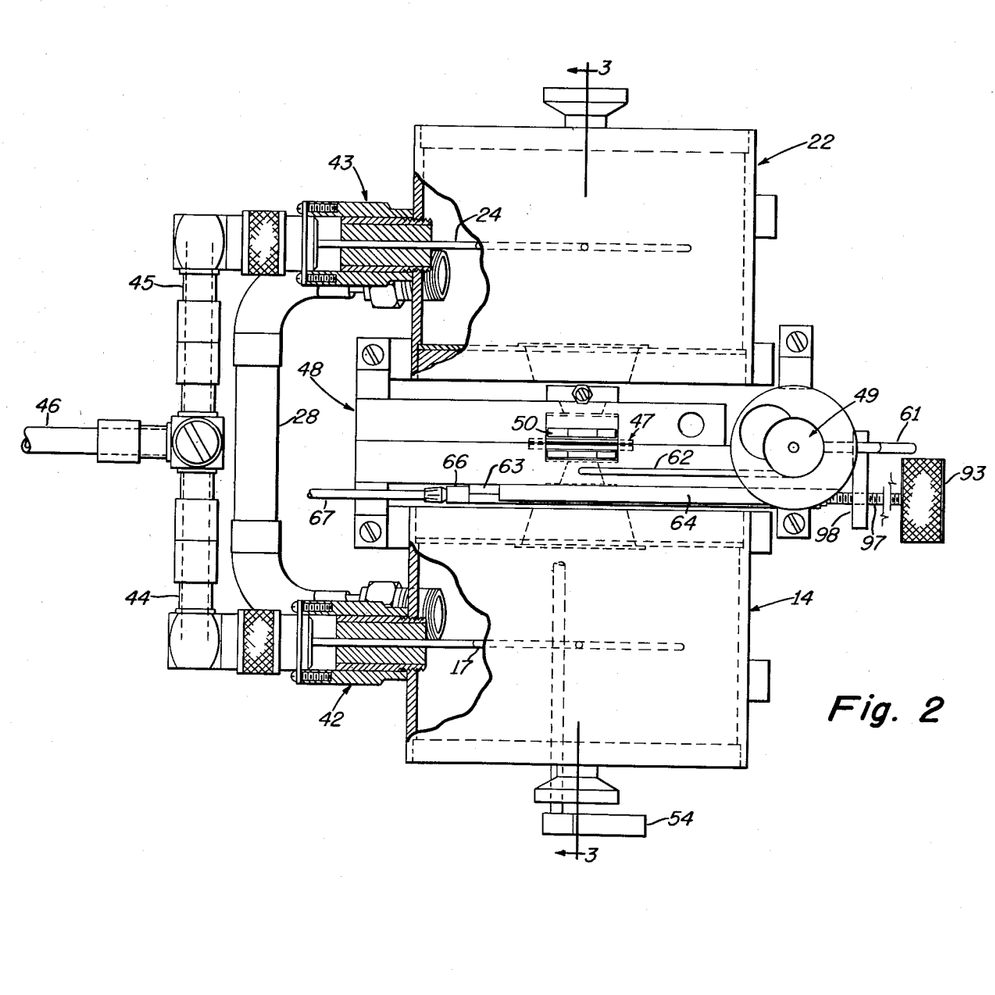
Figure 2 is a plan view partially in section showing details of a subassembly of one embodiment of our invention.
Figure 3:
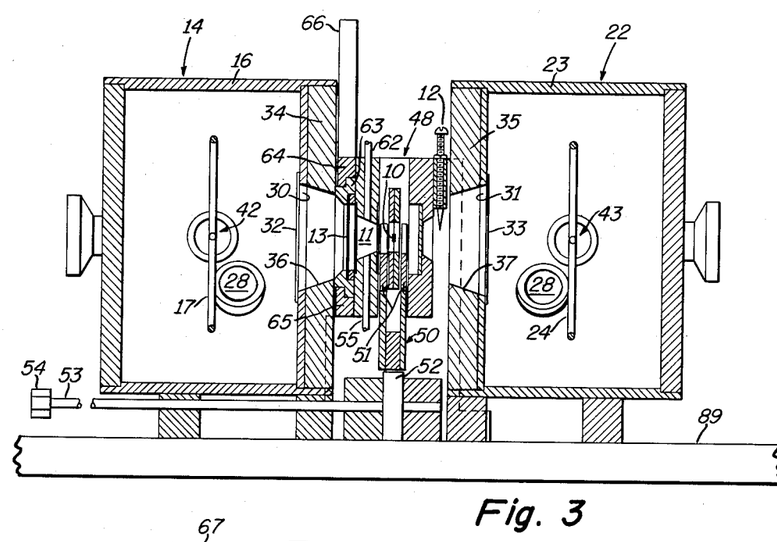
Figure 3 is an elevation in section of the ion chamber and cell block structure subassembly.
Figure 4:
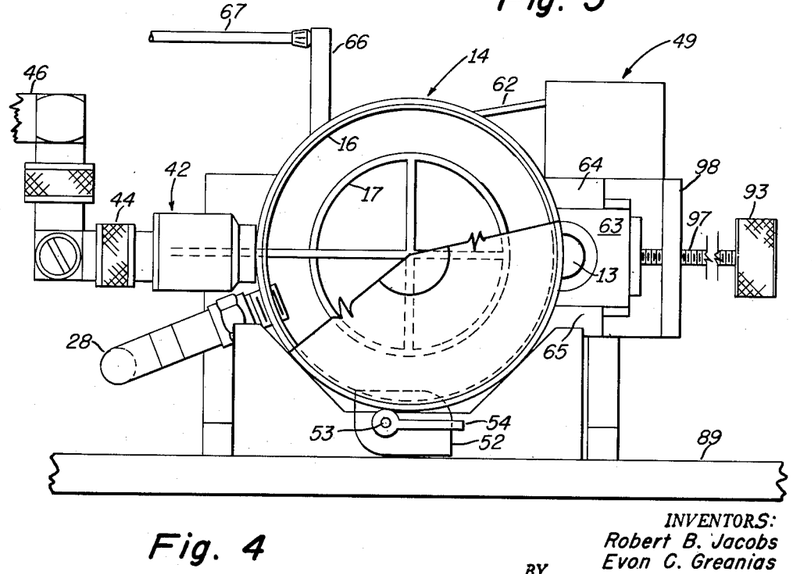
Figure 4 is an end view partially in section of the ion chamber and cell block structure of Figure 3.

The ionization chambers 14 and 22, shown in detail in Figures 2, 3 and 4, may comprise essentially brass cylinders about 3 inches long and about 4 inches in diameter with circular windows 30 and 31 in the front of each chamber to allow the beta rays to enter. These windows may be about 1.25 inches in diameter and covered by thin mica sheets 32 and 33. Lead shields 34 and 35 about 0.375 inch thick screen out secondary X-rays created by the beta rays which are stopped in front of the chambers. The lead shields are provided with conical windows 36 and 37 registering with the circular windows 30 and 31 on the front walls of the chambers 14 and 22. The collectors 17 and 24 are essentially wheels with four spokes mounted with their planes perpendicular to the direction of the beta rays. The collectors 17 and 24 are well insulated from ground and from the walls 16 and 23 of the chambers by means of plug insulators 42 and 43 extending through the walls of the chambers. The collectors 17 and 24 are connected to each other by shielded leads 44 and 45 which consist of standard amphenol connectors, and to the current indicator 19 with a very high resistance shielded cable 46. The cable may be, for example, of teflon dielectric. The distributed capacitance of the cable 46 and of the ion chambers 14 and 22 (which may be approximately 50 M. M. F.) across the high resistance input of the current indicator 19 (approximately $10^{12}$ ohms), filters the input current with a time constant of about 50 seconds. This gives an average current reading which includes the effect of a large number of beta rays and minimizes any error due to the random production of beta rays by the radioactive source 10.

Figures 5, 7:
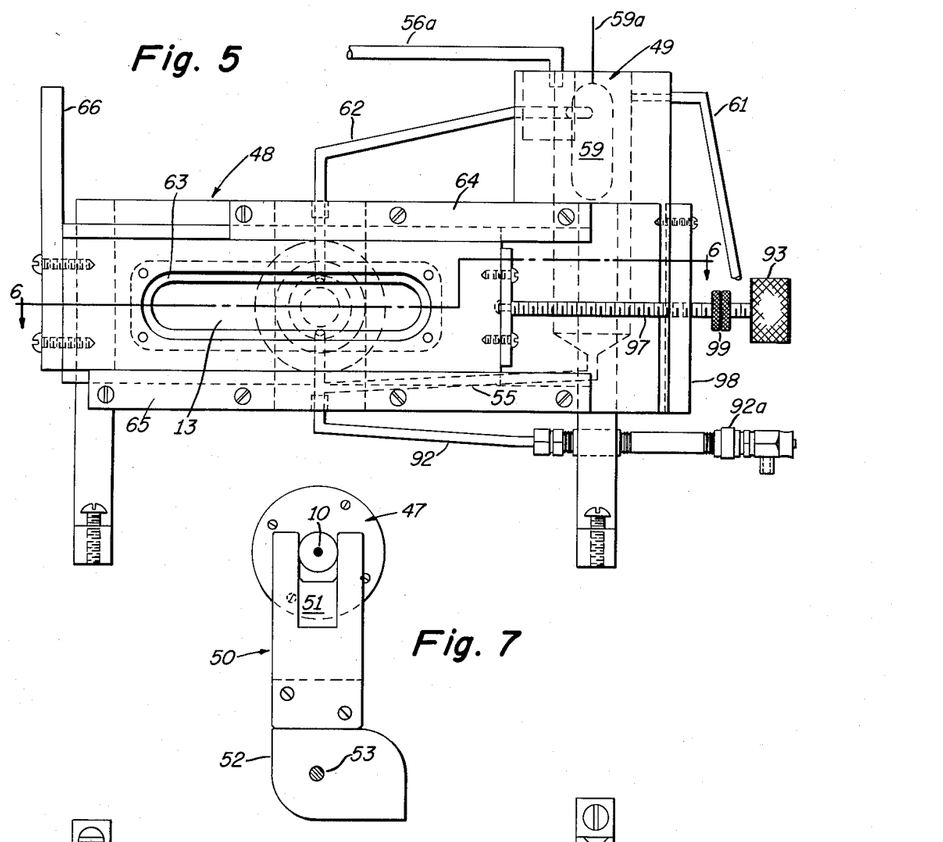
Figure 5 is an elevation of the cell block structure showing the wedge control mechanism.
Figure 7 is an elevation of the source and shutter in the exposed position.
Figure 6:
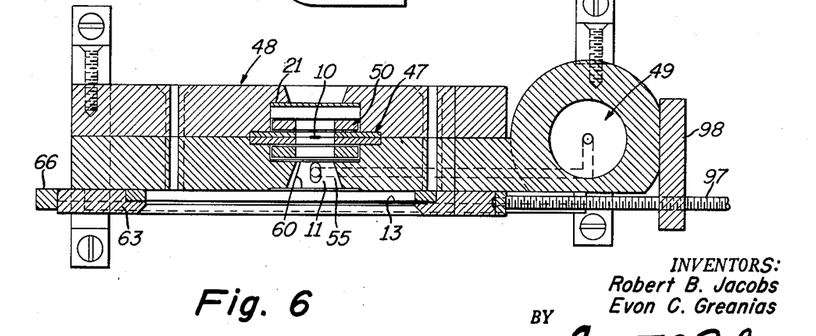
Figure 6 is a section taken along the line 6—6 in Figure 5 and showing the details of the beta ray source support, and the sample cell and reservoir structure.

Detailed views of the source and shutter mechanism can be seen in Figures 3, 6 and 7. The source 10 may be made by depositing a layer of radioactive salt on a thin gold foil. For example, if a strontium—90 salt with specific activity greater than 0.5 mc. per milligram is used, approximately 2 mc. of the radioactive material may be confined within an 0.25 inch circle on the foil to produce a satisfactory source. A second piece of gold foil covers the radioactive material and the unit is sealed at the edges and placed in a holder 47 to be rigidly mounted on the copper cell structure 48.

A hand-operated heavy metal shutter 50 can be lifted around the source 10 to prevent beta rays from entering either of the ion chambers 14 or 22 when the zero of the current indicator 19 is being adjusted. This structure may comprise a box-like element having tungsten alloy inserts 51 in the side walls. This shutter 50 can be raised by means of cam 52, which is actuated through rod 53 and lever 54. By turning the lever 54, the cam 52 acts on the bottom of the shutter unit 50 and raises it until it encloses the source 10.

As shown in Figures 3, 5 and 6, the copper cell structure or block 48 includes a sample cell 11 and a reservoir 49 integral therewith to form a single massive all-copper unit 48 of essentially uniform temperature. A channel 55 connects the base of the reservoir 49 with the cell 11. The cell 11 is filled by pouring the sample into the reservoir 49 through a filling funnel 56 and in flowing from the reservoir 49 to the sample cell 11, the sample is quickly brought to the copper temperature.

The sample cell 11 in the copper block 48 may be made by sealing two thin pieces of mica 60 (approximately 0.002 inch thick) on each end of a truncated conical hole cut through a section of the copper 0.270 inch thick. The filling channel 55 is drilled into the copper block 48 to meet the cell 11 at its lowest point. An air vent channel 62 is drilled in the copper block 48 to meet the cell 11 at its highest point to prevent the collection of air bubbles therein. It discharges at its upper end into the reservoir 49 below the overflow 61.

In addition to the source 10, the sample cell 11 and the reservoir 49, the block 48 includes the standard absorber 21 which is made of Invar. The thickness of the Invar absorber 21 is determined by the high end of the electron density range to be covered. An Invar absorber of 0.027 inch thickness will include most liquid hydrocarbons when used with a cell 11 of 0.270 inch length and a suitable movable wedge 13.

Referring to Figures 3, 5, and 6, the movable wedge 13 can be made of any suitable material such as aluminum, Duralumin, Invar or plastic so long as it is ultimately calibrated with known hydrocarbons. A Duralumin wedge which tapers from 0.001 inch to 0.25 inch covers a reasonable range of hydrocarbons when used a 0.270 inch cell 11. This wedge 13 may be about 2⅝ inches in length and mounted in a holder 63 and adapted to slide across the path of the beta rays on guides 64 and 65 fixed to the side of block 48. The wedge 13 may be sandwiched between the plates of holder 63. A suitable mechanism such as an Ames dial gage 68 is linked to the wedge 13 by bar 66 and rod 67 to measure accurately the wedge position.

An initially adjustable compensating wedge 12 of the same material and tapered as the movable wedge 13 may be used to equalize the paths of the beta rays passing through cell 11.

Figure 8:
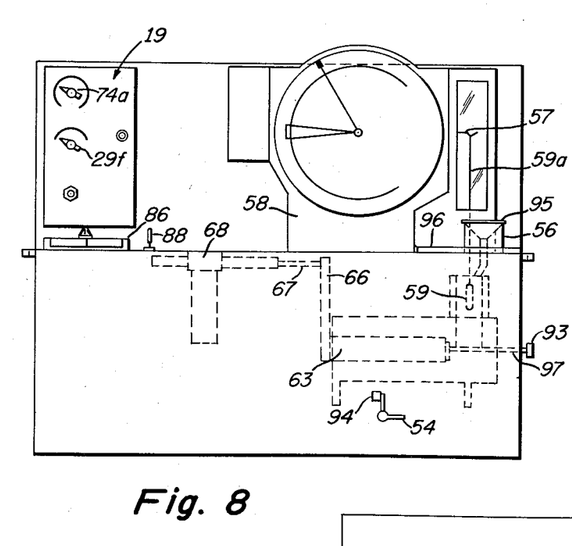
Figures 8, 9 and 10, are elevation, side and plan views respectively of the exterior of a complete instrument assembly.
Figure 9:
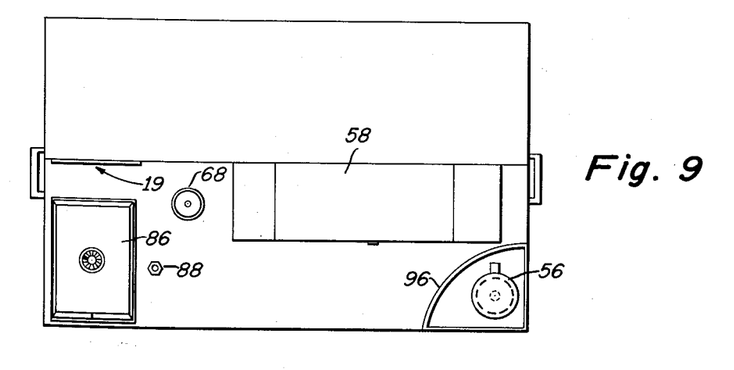
Figure 10:
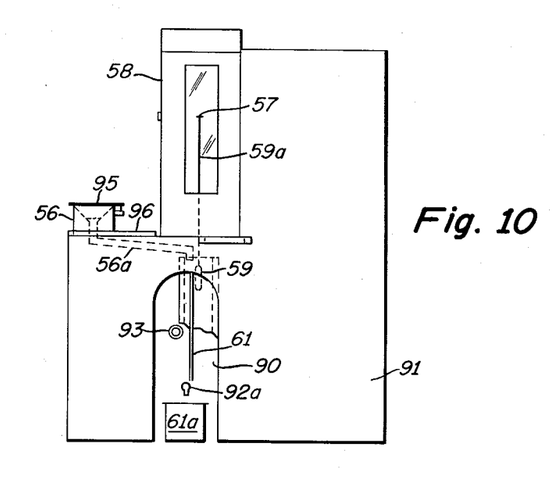

Referring to Figures 8, 9 and 10, these are elevation, plan and side views respectively, of one embodiment of the invention showing the exterior components of the apparatus. A port 90 in the side wall 91 of the cabinet permits access to the sample drain 92 and the wedge adjusting nob 93. On the lower front wall is provided the control lever 54 and stop 94 for positioning the shutter-lifting cam 52. When the lever 54 is in the horizontal position, the shutter 50 is in its lowermost position and the source 10 is then exposed as shown in Figures 3 and 7.

The sample reservoir 49 is located directly below the weighing hook 57 of an accurate torsion balance 58. Suitable balances of this type are manufactured by the Roller-Smith Company of Bethlehem, Pennsylvania. With the proper balance and a 4 cc. bob 59 hung from the hook 57 and immersed in the liquid in the open reservoir 49, the specific gravity $\rho$ of the sample can be measured accurately to four significant figures.

A fill pipe 56a and funnel 56 is provided with a snap cover 95 and an overflow tray 96. The fill pipe 56a discharges into the open reservoir 49. The torsion balance 58 is supported by the cabinet. A line 59a supports the bob 59 from the hook 57 and passes through a port in the top of the cabinet.

The controls for the electrometer circuit 19 are mounted on the upstanding upper front wall of the cabinet and the adjusting nobs 74a and 29f operating the resistor 74 and switches 29a, 29b, 29c, 29d, 29e, respectively, are accessible. The dial of the gage 68, which indicates the position of the wedge 13, and the galvanometer 86 for indicating the null condition are shown.

Figure 11:
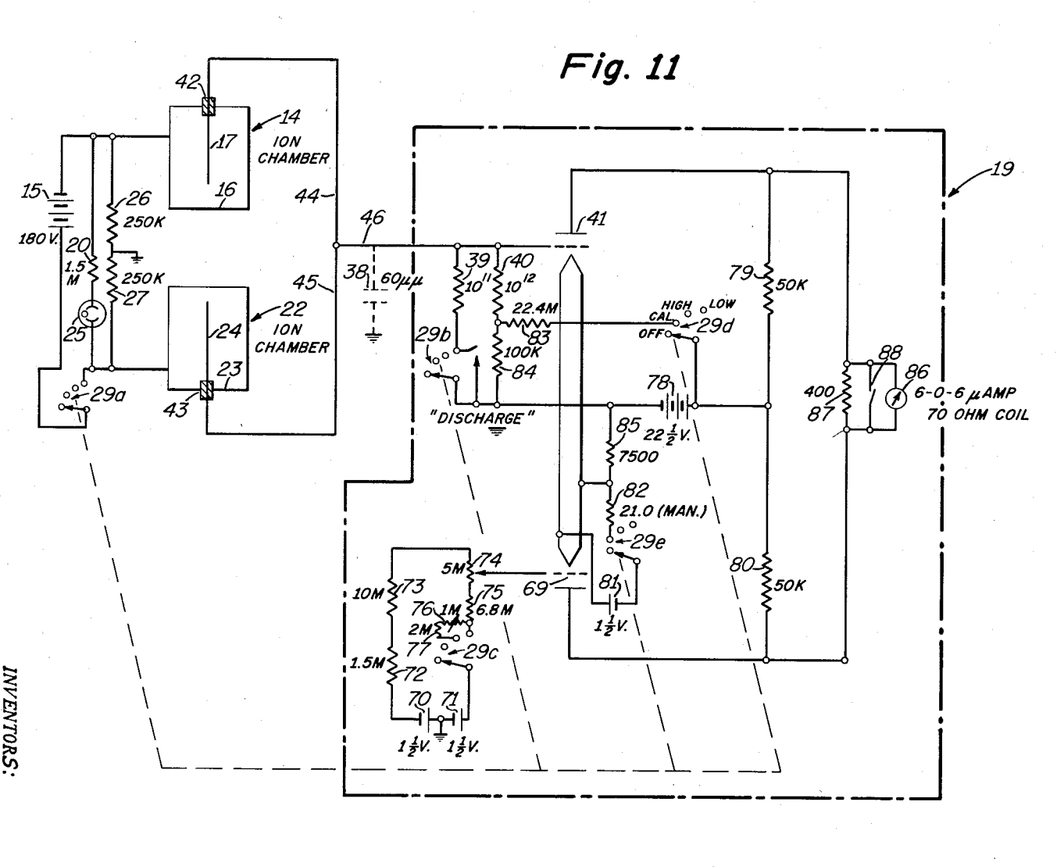
Figure 11 is a complete circuit diagram of a preferred embodiment of our invention.

Referring to Figure 11, we have illustrated one form of the complete electrical circuit associated with the apparatus. This circuit includes the ion chambers 14 and 22, the shielded leads 44 and 45, the shielded cable 46, the battery 15, grounded resistors 26 and 27, a pilot light 25, current limiting resistor 20, and the electrometer circuit 19. The operation of this circuit can be briefly described as follows:

When the switch 29a, b, c, d, and e, is turned to any of the on positions (calibrate, high, or low), the pilot light 25 goes on and the battery 15 and the associated resistors 26 and 27 established potentials of plus and minus 90 volts with respect to ground on the walls 16 and 23 of the ionization chambers 14 and 22 respectively. The current due to ionization within the chambers is collected by the collectors 17 and 24 which are insulated from the ion chamber walls by the insulated plugs 42 and 43 and passed into the electrometer circuit 19 by means of the shielded leads 44 and 45 and the shielded cable 46. Since the chamber walls are respectively plus and minus 90 volts with respect to ground, the ion currents coming from the two ion collectors 17 and 24 will oppose each other and tend to cancel as they pass to ground through the shielded cable 46 and the electrometer circuit 19. The distributed electrical capacitance of the shielded leads 44 and 45, shielded cable 46, and the ion chambers is symbolized in this Figure 11 by the capacitor 38. This capacitor serves to filter the net input current to the electrometer circuit 19 and gives an average current reading which includes the effect of a large number of beta rays and minimizes the error due to the natural randomness in the production of beta rays by the source.

Within the electrometer circuit 19, the high resistance resistors 39 and 40 are provided for use on either the high or low sensitivity scale as determined by the selector switch 29b. Two electrometer subminiature triodes 41 and 69 Raytheon type CK570AX, are provided to form a balanced circuit. The conduction of electrometer triode 41 is controlled by the net output current of the ion chambers 14 and 22 passing through either of the resistors 39 or 40.

Conduction of electrometer triode 69 is controlled by the zero adjusting network composed of batteries 70 and 71, resistors 72, 73, 74, 75, 76, and 77 and switch 29c. The plate voltage for both electrometer triodes 41 and 61 is provided by battery 78 through the plate resistors 79 and 80 and filament current is furnished by battery 81 through resistor 82 when switch 29e is on. The resistors 83 and 84 form a voltage divider which provides a fixed bias on the grid of electrometer triode 41 when switch 29d is in the calibrate position. This provides a simple means for checking the sensitivity of the complete electrometer circuit 19. Resistor 85 serves as cathode resistor for both electrometer triodes. Galvanometer 86 is parallel with critical damping resistor 87 and normally closed switch 88 is connected between the plates of the two electrometer tubes 41 and 69. Small differences in the conduction of the ion chambers 14 and 22 are shown by a deflection of the galvanometer 86 when the operator presses the switch 88.

From the above it will be seen that we have attained the objects of our invention and have provided a null-type apparatus which may be used in a system for determining or indicating hydrogen density with reference to the measured electron density of a sample of known specific gravity and composition.

This application is a continuation-in-part of our copending application, Serial Number 223,392 filed April 27, 1951 forfeited and refiled as application Serial No. 505,007 on April 29, 1955, and entitled "Beta Ray Hydrogen Density Indicator."

Although we have described the invention in terms of specific examples and operations which have been set forth in some detail, it is to be understood that these are by way of illustration only and that our invention is not limited thereto. Alternative embodiments of apparatus and variations in operating techniques will become apparent to those skilled in the art in view of our disclosure. Accordingly, modifications of the invention are contemplated without departing from the spirit thereof.

We claim:

1. An apparatus for the non-destructive analysis of hydrocarbons for their hydrogen content which comprises in combination a beta ray detector means comprising essentially a pair of oppositely charged ionization chambers, a source of beta radiation simultaneously exposed to both of said ionization chambers, a beta ray absorber interposed said source and one of said ionization chambers, a sample cell wholly exterior of said ionization chambers, a movable wedge, said cell and wedge being interposed said source and the other of said ionization chambers, said sample cell having windows on opposite sides thereof transparent to beta radiation absorbable by the hydrocarbons in the said cell, a sample reservoir, a channel between said reservoir and said sample cell, said reservoir, channel and sample cell being in heat conducting relationship, a vent from said sample cell, circuit means including the said ionization chambers responsive to the quantity of beta rays received by said ionization chambers, means for balancing the extent of radiation reaching said chambers to produce a zero differential current in said circuit means, and a torsion balance means for determining the specific gravity of the sample in said reservoir during the test.

2. The apparatus of claim 1 which includes in addition a movable shield for enclosing the said source so as to confine the beta rays, said shield comprising a pair of metal plates, longitudinal slots at the upper end of said plates providing windows in register with each other, and a beta ray impervious insert in the lower portion in each of the longitudinal slots, said shield being adapted to place the shielding inserts on opposite sides of a beta ray source.

3. An apparatus for determining percent hydrogen of a hydrocarbon substance which includes a reservoir for the substance, a sample cell in communication with said reservoir, said sample cell comprising a truncated conical chamber having beta ray transparent windows at opposite ends thereof, a standard beta ray absorber aligned with the windows of said cell, a beta ray source between said absorber and said cell, said absorber, said cell and said reservoir being in a compact unit in direct heat-conducting relationship, means for determining the specific gravity of the sample in said reservoir, a pair of spaced ionization chambers having windows positioned equidistant from said source and in alignment, respectively, with said cell and said absorber, a breathing tube connecting said ionization chambers, an ion collector means in each of said chambers electrically connected to each other, means for applying equal and opposite potentials to said ionization chambers, an electrometer circuit, conductor means between said collectors and said electrometer circuit, a galvanometer in said electrometer circuit functioning as a null indicator, an adjustable tapered wedge between said cell and the adjacent ionization chamber, and scale means associated with said adjustable wedge for indicating its relative position across the beam of beta rays from said source to said ionization chamber.

4. An apparatus for determining the hydrogen content of a liquid hydrocarbon sample which comprises in combination an open-topped reservoir, a sample cell in direct thermal communication with said reservoir, a beta ray source, a pair of opposed ionization chambers in axial alignment and equally spaced from said source, said sample cell being interposed said source and one of said ionization chambers, means for placing said ionization chambers under equal and opposite potentials, means for combining electrically the output of said ionization chambers, a reservoir, conduit means connecting said reservoir and said cell, a plumb bob of a gravimetric balance supported within said reservoir, a movable wedge interposed said source and said ionization chamber, a standard beta ray absorber interposed said source and the other of said ionization chambers, a null indicator circuit means, means for applying the combined output from said ionization chambers to said null indicator circuit means, a galvanometer for indicating the condition of said null indicator circuit means, and a scale for indicating the position of said adjustable wedge.

5. A process for the analysis of combined hydrogen in a hydrocarbon of known density comprising the steps of projecting a beam of beta radiation through a sample of said hydrocarbon, simultaneously passing a beam of beta radiation from the same source through a standard beta ray absorber, converting the transmitted beta radiation unabsorbed by said sample and said absorber into quantities of electrical energy, adjusting the beam of unabsorbed beta radiation passing through said sample so as to equalize the quantities converted to electrical energy and ascertaining the necessary adjustment of the beam as an indication of the relative proportion of combined hydrogen in the said sample.

6. A physical process for quantitatively determining the hydrogen content of hydrocarbon substances of measured density which comprises the steps of measuring the specific gravity of one portion of a sample of a hydrocarbon substance, concurrently exposing another portion of said sample of the hydrocarbon substance to beta radiation, simultaneously exposing a standard absorber to said beta radiation, measuring the radiation absorption coefficient of the sample and of the absorber, and compensating for differences in the absorption coefficients as an indication of the hydrogen content of the hydrocarbon substance as compared to the standard absorber.

7. The method of determining the proportion of hydrogen in hydrogen-carbon compounds which comprises measuring the specific gravity of the sample, concurrently subjecting another portion of said sample under identical temperature conditions to beta radiation, simultaneously subjecting a standard absorber to said beta radiation, collecting the unabsorbed radiation passing through said sample and said absorber, converting said radiations to potentials of opposite polarity, and utilizing the specific gravity measurement and the differential in the said potentials in combination as an indication of the proportion of hydrogen in the sample as compared to a standard reference sample under similar conditions of radiation and temperature.

8. In a physical process for quantitatively analyzing hydrocarbon liquids for hydrogen, the steps which comprise simultaneously exposing an unknown sample of hydrocarbon liquid and a standard beta ray absorber corresponding in absorption characteristics to a hydrocarbon liquid of known hydrogen content and known density to beams of beta rays from a single source, concurrently determining the density of said sample, adjusting the extent of radiation of the sample and of the standard absorber so that the unabsorbed radiation from both the sample and the absorber are identical, and determining the hydrogen content of the sample from the degree of adjustment necessary.

9. The method of determining the hydrogen content of a hydrocarbon which comprises the steps of measuring the specific gravity of the hydrocarbon at a constant temperature, simultaneously passing beta rays from a single source through a volume of said material at said constant temperature and simultaneously through a standard beta ray absorber, separately collecting beta rays passing through said standard absorber and through said hydrocarbon sample, converting the collected beta rays into separate quantities of electrical energy of opposite polarity, applying said energy to a null indicator circuit, and adjusting the beta ray beam unabsorbed by the hydrocarbon sample to be equal that unabsorbed by the standard absorber as indiacted by the null indicator circuit, the necessary adjustment and the specific gravity measurement being an indication of the proportion of hydrogen in the hydrocarbon sample.

10. An apparatus for quantitatively determining the proportion of hydrogen in a hydrocarbon substance which comprises a radiation detector means for determining the beta ray absorption coefficient of said substance, a source of beta rays, a sample cell means interposed said source and said detector means, and means for determining the specific gravity of the substance in said sample cell means.

11. The method of determining the proportion of hydrogen in hydrogen-carbon compounds which comprises measuring the specific gravity of the sample, concurrently subjecting said sample to beta radiation, and determining the beta ray absorption coefficient of said sample of determined specific gravity, said coefficient and said specific gravity combined being an indication of the proportion of hydrogen in the sample.

12. An apparatus for quantitatively determining the hydrogen content of liquid hydrocarbon substances of known density which comprises a pair of spaced ionization chambers arranged face to face, a beta ray source disposed between and equidistant from said ionization chambers, a sample cell adapted to confine a hydrocarbon sample between said source and a first of said ionization chambers, a movable wedge means interposed said sample cell and the first of said ionization chambers, means for measuring unabsorbed radiation which passes into said ionization chambers, and a meter means for measuring the differential of said radiation reaching said ionization chambers.

13. The apparatus of claim 10 which includes a movable wedge means interposed said sample cell means and said detector means.

14. The apparatus of claim 10 which comprises circuit means including the said radiation detector means responsive to the quantity of beta rays received by said detector means, and means for balancing the extent of radiation reaching said detector means to produce a zero differential current in said circuit means.

References Cited in the file of this patent

UNITED STATES PATENTS

| | | |
|---|---|---|
| 2,097,760 | Failla | Nov. 2, 1937 |
| 2,442,752 | Armstrong | June 8, 1948 |
| 2,467,812 | Clapp | Apr. 19, 1949 |
| 2,519,081 | Skarstrom | Aug. 15, 1950 |
| 2,617,940 | Giguere | Nov. 11, 1952 |
| 2,641,710 | Pompeo et al. | June 9, 1953 |

FOREIGN PATENTS

| | | |
|---|---|---|
| 567,280 | Great Britain | Feb. 6, 1945 |